United States Patent [19]

Uhing

[11] Patent Number: 4,614,124
[45] Date of Patent: Sep. 30, 1986

[54] ROLLING NUT FOR TRANSFORMING A ROTARY MOVEMENT OF A SHAFT INTO A THRUST MOVEMENT OF THE ROLLING UNIT

[76] Inventor: Joachim Uhing, Dorfstede 34, D-2301 Molfsee, Fed. Rep. of Germany

[21] Appl. No.: 574,562

[22] Filed: Jan. 27, 1984

[30] Foreign Application Priority Data

Jan. 27, 1983 [DE] Fed. Rep. of Germany ....... 3302625

[51] Int. Cl.⁴ .............................................. F16H 21/16
[52] U.S. Cl. ............................................ 74/89; 74/25
[58] Field of Search ....................................... 74/25, 89

[56] References Cited

U.S. PATENT DOCUMENTS 3,977,258  8/1976  Bauer ........................................ 74/25
4,253,342  3/1981  Uhing ........................................ 74/89

FOREIGN PATENT DOCUMENTS 1210647  2/1966  Fed. Rep. of Germany .......... 74/89

Primary Examiner—Lawrence Staab
Attorney, Agent, or Firm—Michael J. Striker

[57] ABSTRACT

A rolling nut in combination with a smooth shaft includes a plurality of bearing-like roller cages surrounding the shaft and having internal surfaces in contact with portions of the outer surface of the shaft and is operative for transforming a rotary movement of the shaft into thrust movement of the rolling nut. The rolling nut is open and is provided with a base plate formed with a plurality of pocket-shaped recesses in which the roller cages are partially inserted. The base plate is formed with similar recesses at both sides thereof so that the roller cages can be repositioned on either side of the plate to selectively adjust the roller cages to the left hand thread of the shaft or the right hand thread of the shaft.

2 Claims, 8 Drawing Figures

ROLLING NUT FOR TRANSFORMING A ROTARY MOVEMENT OF A SHAFT INTO A THRUST MOVEMENT OF THE ROLLING UNIT

BACKGROUND OF THE INVENTION

The present invention relates to an arrangement for transforming a rotary movement of a smooth shaft into a thrust movement of a nut, and more specifically to a rolling nut for effecting this transformation.

Rolling nuts of the type under consideration have been known in the art.

One of such rolling or roller nuts is disclosed in applicant's U.S. Pat. No. 4,253,342. The disclosed arrangement includes three or four roller rings which have inner surfaces that roll on a smooth round outer surface of the shaft. The roller rings are mounted on the shaft so that they are inclined to the axis of the shaft and are with that shaft in a friction contact connection. The contact surfaces of the shaft and the roller rings are so selected that the rolling tracks of the roller rings describe on the shaft uniform helical lines. The roller rings are accommodated in a two-part housing which is provided with corresponding recesses for receiving the roller rings and with elastic means which generate pressure forces (friction contact) between the roller rings and the shaft. Such rolling nuts have a high accuracy, however in many cases they are too expensive and too special. For example, it is difficult or impossible with this construction to readjust the direction of the pitch from the left hand to the right hand or to one or another value of the pitch. The disadvantage of these otherwise satisfactory roller nuts resides in the subdivision of the housing into two parts, which always requires a multiple readjustment and bolting of those two parts to each other.

It is a great advantage of the known roller nuts that they are accommodated in a closed housing. However, such a protection by the enclosed housing is not always necessary in practice. Very often small dimensions of the entire constructions appear to be more important than the protection of the roller rings. This can be achieved by a so-called open rolling nut arrangement, in which no housing, which encloses the roller rings, is employed. The risk of contamination is very insignificant when the roller rings with sealing discs are employed, as is in the case of roller bearings.

SUMMARY OF THE INVENTION

It is an object of the present invention to provide an improved rolling nut-smooth shaft arrangement.

It is a further object of this invention to provide an arrangement for transforming a rotary movement of a shaft into a thrust movement of a nut, which requires less space than those known in the art and is yet universally applicable for various constructions of rolling nut arrangements.

These and other objects of the invention are attained by a rolling nut in combination with a smooth shaft for transforming a rotary movement of the shaft into a thrust movement of the nut, comprising a base plate, and a plurality of annular roller cages arranged in said base plate at an angle one to another and each having an inner annular surface engageable with an outer surface portion of said shaft, said annular roller cages including two lateral roller cages fixed in said plate and at least one intermediate roller cage arranged between said lateral roller cages and mounted in said plate so that the position of the intermediate roller cage is variable relative to said plate.

The base plate has a front side and a back side opposite to said front side, said plate may be formed at said front and back side thereof with pocket-shaped recesses for receiving said roller cages.

The roller cages may be adjustable from the left hand thread of said shaft to the right hand thread thereof and vice versa by repositioning of said roller cages from the front side of said plate onto the back side of said plate and vice versa.

The rolling nut can further include means for generating a thrust force in the rolling nut, said means including at least one flat spring which bears against an outer surface of said intermediate roller cage.

Two intermediate roller cages may be provided between the lateral roller cages, said spring overlapping outer surfaces of said two intermediate roller cages.

The rolling nut may further include means for connecting said spring to said base plate and including connecting bolts, said spring and said connecting means adjusting the position of the intermediate roller cages relative to said plate, the intermediate roller cages being positioned in respective recesses so that a slight lifting movement of said intermediate roller cages is permitted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
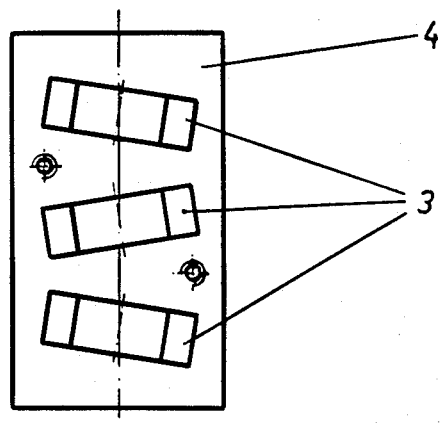
FIG. 1 is a top plan view of a base plate for receiving the roller rings, accodrding to the invention.
Figure 2:
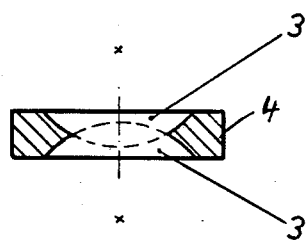
FIG. 2 is a sectional side view through the plate of FIG. 1.
Figure 3:
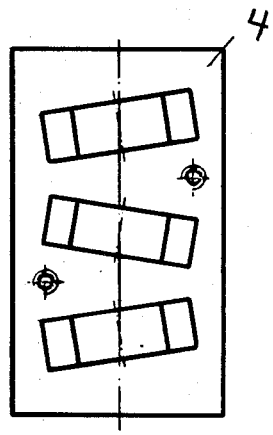
FIG. 3 is a plan view of the base plate from below.
Figure 4:
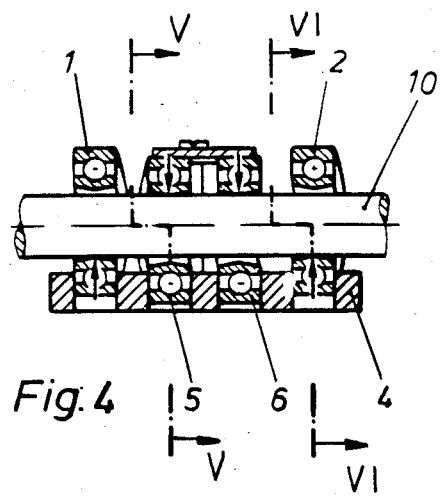
FIG. 4 is a side sectional view of the open roller nut with four roller rings.

Referring now to the drawings in detail, a base plate 4 has at both opposite sides thereof recesses or pockets 3 in which roller rings or roller cages 1, 2, 5 and 6 shown in FIG. 4 are inserted. FIGS. 1 through 3 shows the base plate 4 for three roller rings. Both lateral roller rings 1 and 2 are inserted into the respective pockets in base plate 4 in such a manner that they are fixed therein without any play; however as seen from FIG. 7, they are adjusted according to a required pitch angle $\beta$. For both intermediate roller rings 5 and 6 are provided in the base plate 4 pockets 3 which have a fixed position or orientation in the direction of pitch angle $\beta$ but, however an insignificant lifting movement in the planes of the rings is permitted. Roller rings 5 and 6 are secured against dropping out from the base plate by means of a spring 7. The latter can be so adjusted by means of bolts 8 and 9 that pressure forces necessary to ensure a friction contact between roller rings 1, 2, 5 and 6 and shaft 10 are generated.

The transformation of the rotary movement of shaft 10 into a thrust movement of roller rings 1, 2, 5 and 6 takes place in the known fashion described in applicant's U.S. Pat. No. 4,253,342, the entire disclosure of which is incorporated herein by reference.

Figure 5:
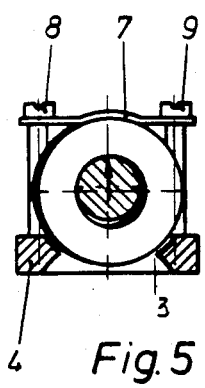
FIG. 5 is a sectional view taken along line V—V of FIG. 4.
Figure 6:
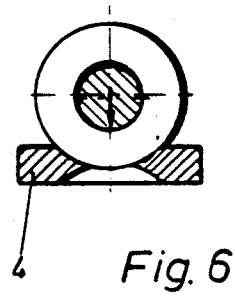
FIG. 6 is a sectional view taken along line VI—VII of FIG. 4.
Figure 7:
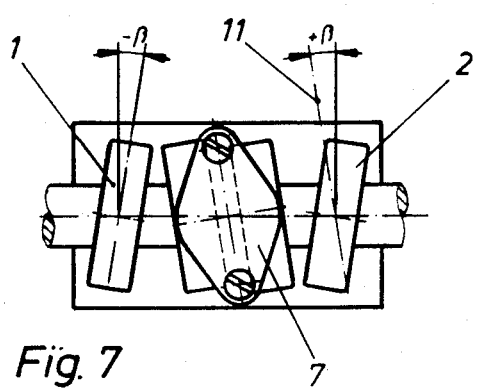
FIG. 7 is a plan view of the roller nut of the invention with four roller rings.

In the arrangement of roller rings 1, 2, 5 and 6 according to FIG. 7, upon rotation of shaft 10, a left-hand thread movement is carried out. However, for the right-hand thread of the shaft the roller rings must be readjusted in another direction; for example, roller ring 2 in FIG. 7 is in the position which is indicated by a center line 11. The readjustment of the roller rings from the left-hand thread of the shaft to the right-hand thread is possible with the single base plate 4. This plate therefore has additional pockets 3 formed at the back side thereof opposite to the pockets provided on the upper or front side of the base plate. The lower pockets or recesses 3 are similar to the upper pockets or recesses and overlap each other as clearly shown in FIG. 2 or FIG. 5 of the drawings. In order to carry out readjusting of the roller rings from the left hand thread of the shaft to the right hand thread of the shaft, the roller rings or cages are relocated from one side of the base plate to another side of the plate 4. Thereby, necessary spare parts of the construction can be obtained. The spring 7 can also be applied at both sides of the base plate because the thread of bolts 8 and 9 can be utilized for both sides of the plate.

Figure 8:
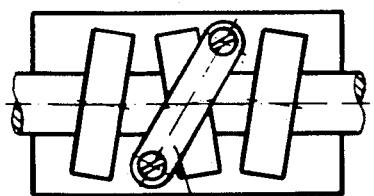
FIG. 8 is a plan view of the roller nut according to the invention, with three roller rings.

Roller nuts illustrated in FIGS. 4 and 7 are suitable for the optimal utilization because all four roller rings are uniformly loaded and a thrust force of the roller nut is proportional to the sum of all pressure forces exerted in the contact lines between the roller rings and the shaft. The rolling nut having four roller rings or cages may be loaded twice as much as the nut having three roller cages illustrated in FIG. 8. In the construction with three roller rings, pressures exerted on the lateral roller rings are only half as much as the pressures allowable on the inner ring. Thus, variations can be obtained in possible thrust forces by utilization of three-ring or four-ring constructions and also by utilization of smaller base plates. Fastening openings at all sides of the base plate can be formed.

In order to increase a thrust force of the roller nut more roller rings can be also provided in the nut wherein a uniform distribution of pressures can be obtained.

The recesses or pockets for receiving the roller rings in accordance with a left hand thread or a right hand thread of the shaft can be also provided only on one side of the base plate if the dimensions of the construction permit to do so.

It will be understood that each of the elements described above, or two or more together, may also find a useful application in other types of a rolling nut including roller rings differing from the types described above.

While the invention has been illustrated and described as embodied in a roller nuts, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A rolling nut in combination with a smooth shaft for transforming a rotary movement of the shaft into a thrust movement of the nut, comprising a plate-shaped base; two lateral roller cages; and at least one intermediate roller cage, said roller cages surrounding said shaft and being arranged in said base at an angle one to another and each having an inner annular surface engageable with an outer surface portion of said shaft, said base having a front side and a back side opposite to said front side and being formed at said front and back side with pocket-shaped recesses for receiving said roller cages, each pocket-shaped recess being elongated to define a major axis, the major axes of the recesses for receiving the lateral roller cages being angularly offset from the axis of rotation of the smooth shaft by a given angle in a first direction, the major axes of the recesses for receiving the intermediate roller cage being angularly offset from the axis of rotation of the smooth shaft by said given angle in a second opposite direction, the major axes of corresponding recesses on the front and back sides of the base plate substantially overlaying one another whereby said roller cages are adjustable from the left hand thread of said shaft to the right hand thread thereof and vice versa by repositioning said roller cages from the front side of said base onto the back side of said plate and vice versa.

2. The rolling nut as defined in claim 7, further including means for generating a thrust force in the rolling nut, said means including at least one flat spring which bears against an outer surface of said intermediate roller cage.

* * * * *